United States Patent [19]

Nogai

[11] 4,269,588
[45] May 26, 1981

[54] INJECTION MOLDING MACHINE
[75] Inventor: Akira Nogai, Kurobe, Japan
[73] Assignee: Yoshida Kogyo K.K., Tokyo, Japan
[21] Appl. No.: 65,104
[22] Filed: Aug. 9, 1979
[30] Foreign Application Priority Data Aug. 12, 1978 [JP] Japan .................................. 53-98295
Aug. 18, 1978 [JP] Japan ................................ 53-101336

[51] Int. Cl.³ .......................... B29F 1/06; B29D 5/00
[52] U.S. Cl. .................................. 425/545; 425/576;
425/593; 425/595
[58] Field of Search ............... 425/545, 576, 593, 595,
425/DIG. 34

[56] References Cited
U.S. PATENT DOCUMENTS 3,806,296  4/1974  Aoki .............................. 425/595 X
3,873,257  3/1975  Vanotti .......................... 425/595 X

FOREIGN PATENT DOCUMENTS 2743546  4/1978  Fed. Rep. of Germany .

Primary Examiner—Thomas P. Pavelko
Attorney, Agent, or Firm—Robert E. Burns; Emmanuel J. Lobato; Bruce L. Adams

[57] ABSTRACT

An injection molding machine has a round support member rotatably mounted on a shaft, there being at least a series of molds supported on and along the periphery of the table. Each of the molds includes a pair of relatively pivotable mold members, one of which is operatively connected to a power actuator which includes a fluid-pressurizable cylinder fixed to the support member and a piston having a rod projecting from the cylinder for actuating said one of the pair of mold members.

10 Claims, 8 Drawing Figures

INJECTION MOLDING MACHINE

BACKGROUND OF THE INVENTION

1. Field of the Invention

The present invention relates to an injection molding machine.

2. Prior Art

A known type of injection molding machine as disclosed in German Patent Specification No. 27 43 546 has a plurality of molds carried on and along the periphery of a support table rotatable on a shaft, each mold including a pair of relatively pivotable mold member halves. Heretofore, it has been known to actuate such mold member halves with a cam for opening and closing the individual mold, but because bending moment on the shaft of the support table developed by the cam is extremely large, smooth and precision driving of the shaft is difficult to achieve. Further, with such conventional machine, the shaft suffers in durability.

SUMMARY OF THE INVENTION

According to the present invention, a plurality of power actuators for opening and closing individual molds are carried on a rotatable support member on which the molds are supported, each mold including a pair of relatively pivotable mold member halves. Each of the power actuators comprises a fluid-pressurizable cylinder fixed to the support member, and a piston which is slidable in a bore of the cylinder. The piston has a rod extending from the cylinder and operatively coupled to one of the mold member halves.

It is therefore an object of the present invention to provide an improved injection molding machine which can reduce the amount of bending moment on the shaft of a mold support table to a minimum, permitting smooth and precision driving of that shaft with a minimum amount of driving force.

Many other advantages, features and additional objects of the present invention will become manifest to those versed in the art upon making reference to the detailed description and the accompanying drawings in which preferred structural embodiments incorporating the principles of the present invention are shown by way of illustrative example, and wherein:

DETAILED DESCRIPTION

Figure 1:
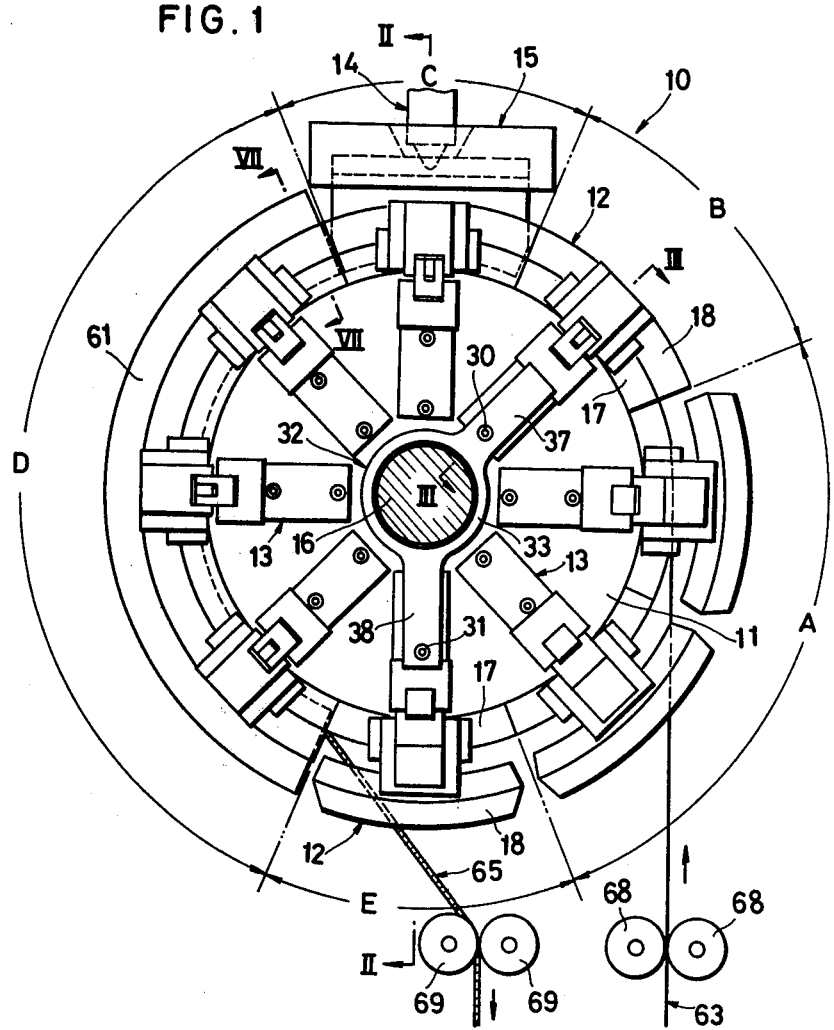
FIG. 1 is a side elevational view, with parts broken away, of an injection molding machine provided in accordance with the present invention.
Figure 2:
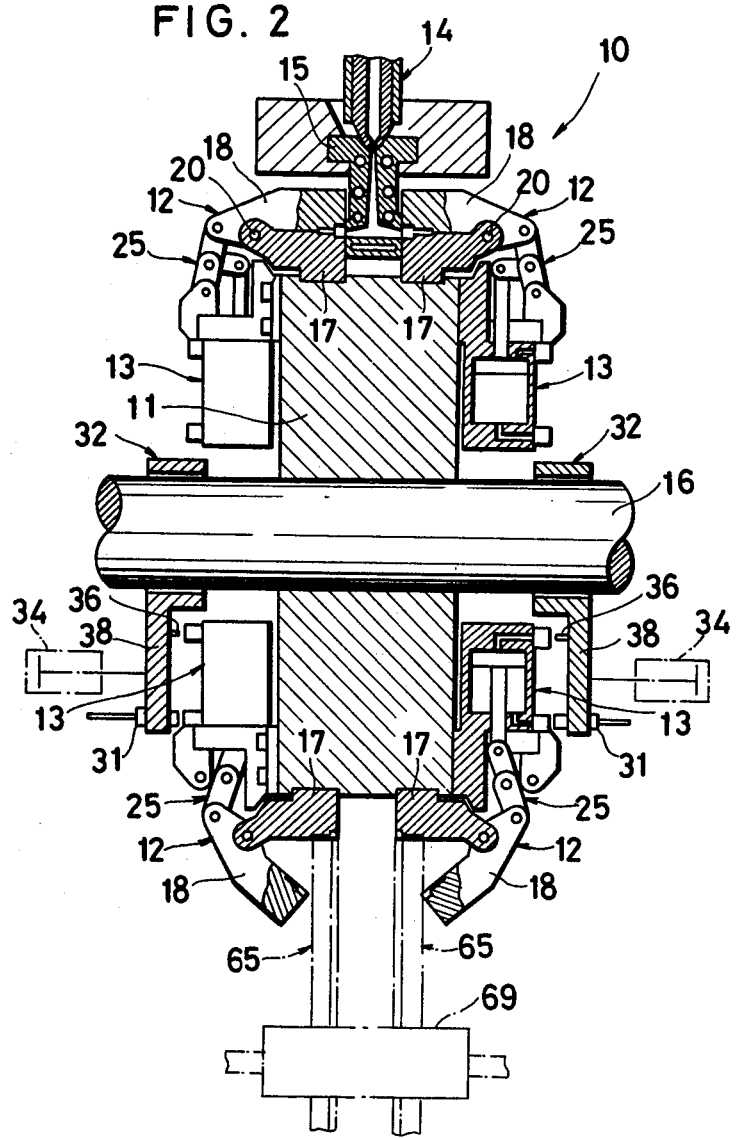
FIG. 2 is a vertical cross-sectional view taken along line II—II of FIG. 1.

The principles of the present invention are particularly useful when embodied in an injection molding machine such as shown in FIGS. 1 and 2, generally indicated by the numeral 10.

The injection molding machine 10 comprises a rotor or rotatable support member 11 supported on a base (not shown), a plurality of molds 12 arranged to be actuated individually by a plurality of power actuators 13, a molding material injection unit 14 (only a discharge nozzle portion of which is shown here), and a manifold on sprue member 15.

The support member 11 is in the form of a round table, and is mounted on a coaxial shaft 16 rotatably supported by the base.

The molds 12 consist of a pair of series of molds arranged in mirror image relationship, as shown in FIG. 2. The molds of each series 12 are arranged on and along the periphery of the round support member 11, and extend circumferentially of the latter so as to fit next to each other to provide an endless mold assembly 12A(12B). Preferably, each of the molds 12 coextends with one of equally divided circumferential parts of the round support member 11. Each mold 12 includes a pair of first and second mold members 17,18 jointly providing therebetween a predetermined number of separate mold cavities 19 (FIG. 3) (hereinafter referred to as "mold cavity" for clarity), the number of which is not here pertinent. The first mold member 17 is fixed to the support member 11, and the second mold member 18 is pivotally mounted on the first mold member 17 by means of a pin 20.

Figure 3:
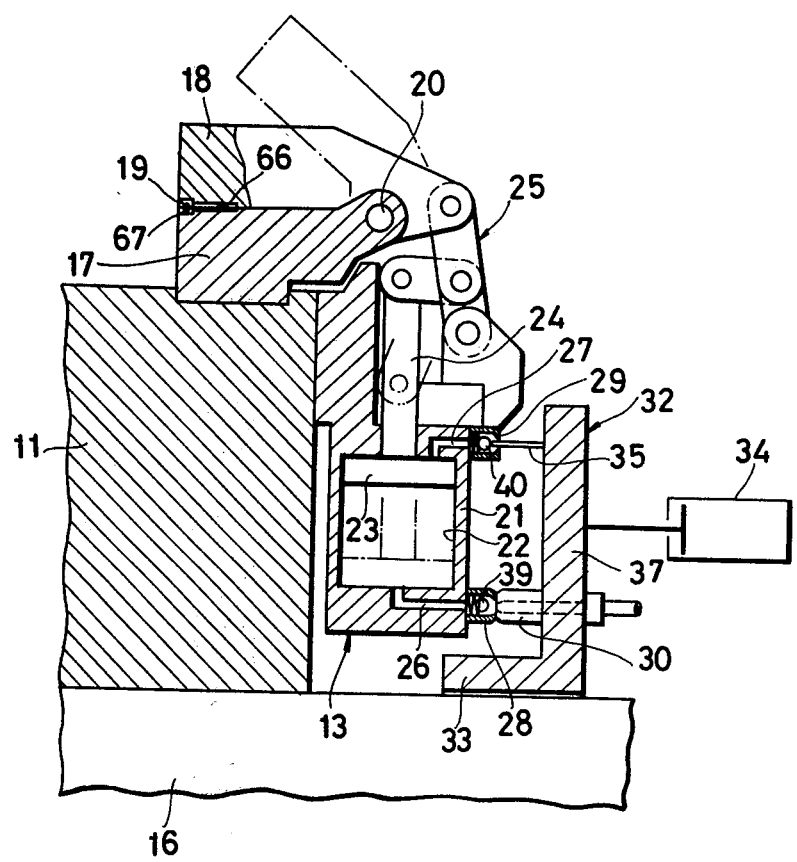
FIG. 3 is a cross-sectional view taken along line III—III of FIG. 1, showing a power actuator on an enlarged scale.

The power actuators 13 are carried on the support member 11 and each of them is operable on one of the molds for opening and closing it and for maintaining the same in its open and closed positions. In FIG. 3, each of the power actuators includes a cylinder 21 that can be pressurized with a pressure fluid, here comprising air. The cylinder 21 has a bore 22 within which there is a piston 23. From the piston 23, there extends a piston rod 24 which extends through one end of the cylinder 21 and which is operatively coupled at its free end to the second mold member 18 of the said one mold through a toggle joint 25. If desired, the piston rod 24 can be connected directly to the second mold member 18. Accordingly, the second mold member 18 can be moved pivotally about the pin 20 in response to reciprocating movement of the piston 23 in the bore 22 of the cylinder 21; that is, in FIG. 3, when the piston 23 is moved from its uppermost position to its lowermost position indicated by phantom lines, the second mold member 18 pivots clockwise on the first mold member 17 to open the mold 12, as shown by phantom lines. And, when the piston 23 is back to its raised position, the second mold member 18 returns to its original position and thus the mold 12 is closed.

The cylinder 21 has a pair of passage-ways 26,27 each extending through one of ends of the bore 22 for conducting pressurized fluid into and out of the pressure chamber at one of opposite sides of the piston 23. At its outer end of each passage-way 26(27), there is a check valve 28(29) through which the passage-way 26(27) can be connected to a fluid conduit 30(31) for conducting pressure fluid.

For each mold assembly 12A(12B), the two conduit 30,31 are carried at their one ends by a two-armed support 32. The support 32 has a base portion 33 extending around the shaft 16 so that the support 32 can be moved in the axial direction of the shaft 16, irrespective of rotation of the latter. A suitable actuator, such as a pump 34, is operatively coupled to the support 32 for moving the latter toward and away from the rotatable support member 11 to bring the conduits 30,31 into and out of connection with the passage-way 26,27, respectively. As best shown in FIG. 3, a push rod 35(36) on each support arm 37(38) acts to push a spring-biased ball 40(39) in the check valve 29(28) in the open direction, permitting pressure fluid in the pressure chamber at one side of the piston 23 to discharge from the valve 29(28) when pressure fluid is forced into the pressure chamber at the other side of the piston 23.

Figure 4:
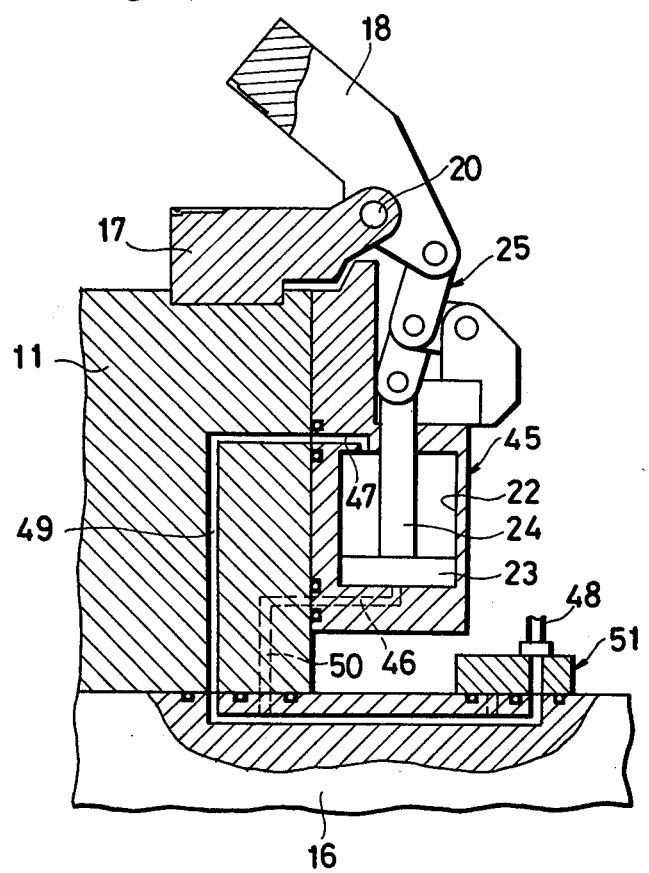
FIG. 4 is a view similar to FIG. 3, but showing a modified form of the power actuator of FIG. 3.

FIG. 4 illustrates an alternative power actuator 45 which differs from the power actuator 13 of FIG. 3 only in that a pair of passage-ways 46,47 at the opposite ends of the bore 22 can be connected to a fluid conduit 48 respectively through a pair of sub-passage 49 and 50, each sub-passage extending through the mold support member 11 and the shaft 16. Designated at 51 is a rotary valve which is suitably mounted on the shaft 16.

Figure 5:
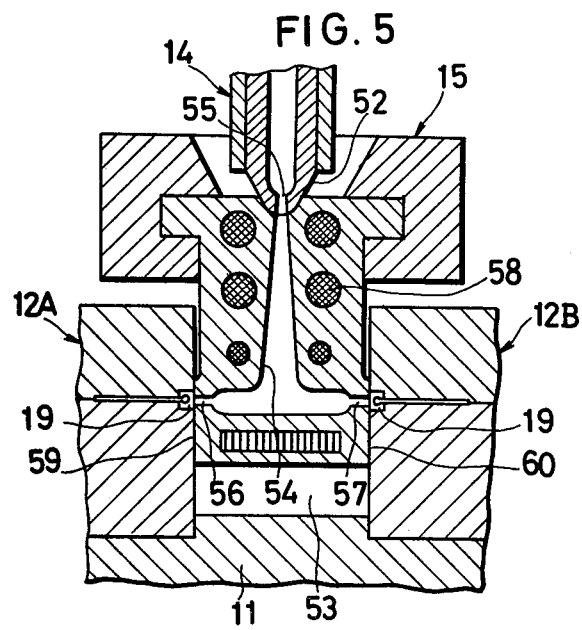
FIG. 5 is a fragmentary portion of FIG. 2, showing a sprue member on an enlarged scale.

The injection unit 14 has a discharge nozzle 52 (FIGS. 5 and 6) from which molding material is to be discharged. The discharge nozzle 52 is disposed alongside of the annular mold assemblies 12A,12B, and is movable toward and away from the spacing 53 between the opposed mold assemblies 12A and 12B. The sprue member 15 is positioned between the discharge nozzle 52 and the mold assemblies 12A,12B for conducting the molding material from the injection unit 14 into the molds 12 one after another for each mold assembly. For this purpose, the sprue member 15 extends into the inter-mold-assembly spacing 53 and has a sprue 54 communicating at one end with an orifice 55 of the discharge nozzle 52. At the other end, the sprue 54 diverges as a pair of outlets 56,57 opening toward the opposed mold assemblies 12A and 12B, respectively. Designated at 58 is a built-in heater. The sprue member 15 is movable, as a unit with the discharge nozzle 52 of the injection unit 14, between a first position where the outlets 56 and 57 of the sprue 54 are in register with the opposed pair of mold cavities 19 and 19, respectively, and a second position where the outlets 56,57 are out of register with the opposed pair of mold cavities 19,19. While the sprue member 15 is in its second position, mouths of the opposed pair of mold cavities 19,19 can be covered or sealed respectively with a pair of exterior surface portions 56,60 of the sprue member 15 below the sprue outlets 56,57. Thus, these exterior surface portions 59,60 serve as a first seal means for temporarily sealing the oppose pair of mold cavities 19,19 immediately after the latter are filled with the molding material. With this arrangement, degating operation, which is usually necessary to the conventional injection molding machines, can be omitted because there exist no runners with the molded articles from the beginning.

In order to cover or seal the mold cavity mouths of the opposed pair of molds 12,12 immediately after the latter are moved past the sprue member 15, there is a second seal means 61 adjacent to the sprue member 15. The second seal means 61 is in the form of an arcuate block slidably fitted in the inter-mold-assembly spacing 53 and immovable with respect to the base (not shown). The arcuate block 61 extends circumferentially along the annular inter-mold-assembly spacing 53 through a predetermined central angle, which is here three times as large as that subtended by the individual arcuate mold 12 is.

Figure 8:
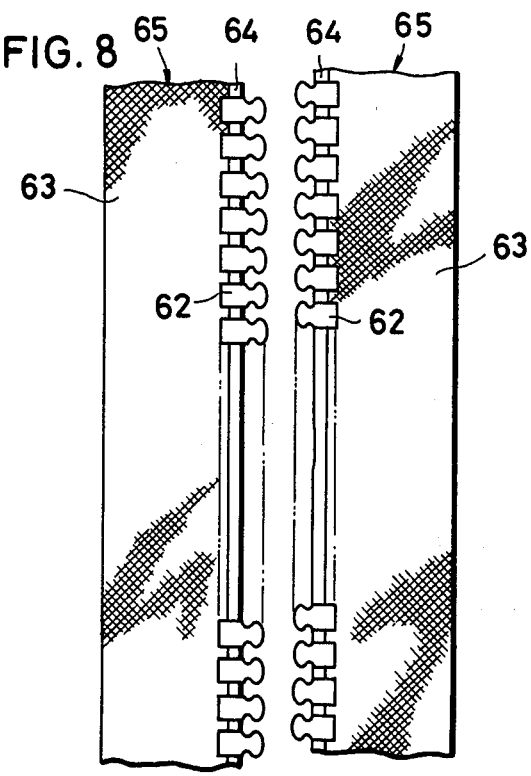
FIG. 8 is a fragmentary plan view of a pair of slide fastener stringers manufactured with use of the injection molding machine of the present invention.

The injection molding machine 10 thus constructed has particular utility for injection-molding a pair of rows of coupling elements 62,62 continuously on an opposed pair of fastener stringer tapes 63,63 of continuous length along their respective beaded edges 64,64 to provide a pair of continuous slide fastener stringers 65,65 such as fragmentarily shown in FIG. 8. For this purpose, each mold 12 has a predetermined number of mold cavities 19 spaced at equal intervals, i.e. an element-to-element distance or pitch, and each mold cavity 19 has the shape of a coupling element 62. Further, each mold 12 has an arcuate clearance space 66 (FIG. 3) provided jointly by the mold members 17,18 and communicating with the mold cavities 19, the clearance space 66 extending through the length of the mold 12 so as to communicate at opposite ends with those of adjacent molds 12. The mold 12 also has a slot 67 (FIG. 3) provided jointly by the mold members 17,18 and extending substantially centrally through the mold cavities 19. With the mold members 17,18 put together, the cleanrace space 66 and the slot 67 can receive therein the stringer tape 63 and the beaded edge 64 thereof, respectively, so as to be held between the mold members 17,18 against accidental displacement during injection molding.

In operation, the pair of mold assemblies 12A,12B each with the continuous fastener stringer tape 63 suitably received between the mold members 17,18 are rotated intermittently for an angular distance corresponding to the central angle which is subtended by one of the arcuate molds 12. In FIG. 1, while the individual mold 12 makes one complete revolution around the shaft 16, the following operations are performed in the following sequence:

(1) Maintaining the mold 12 in its open position at station A, thus facilitating the introduction of the fastener stringer tape 63 into the spacing between the mold members 17,18. The mold 12 has been opened at station E described below. The stringer tape 63 is positively fed by a pair of feed rollers 68,68 in timed relation with the intermittent rotation of the mold assembly.

(2) Closing the mold 12 at station B making its mold cavities 19 ready to be receptive of molding material.

Figure 6:
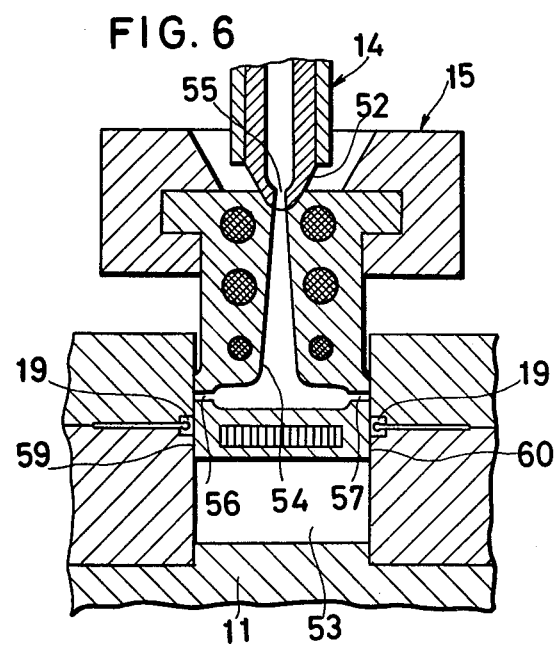
FIG. 6 is a view similar to FIG. 5, but showing the sprue member in its raised position.

(3) Injecting the molding material into the mold cavities 19 at station C (see FIG. 5) and, at the same station, sealing the cavity mouths with the first seal means 59,60 of the sprue member 15 immediately after the cavities 19 are filled with the molding material (see FIG. 6).

Figure 7:
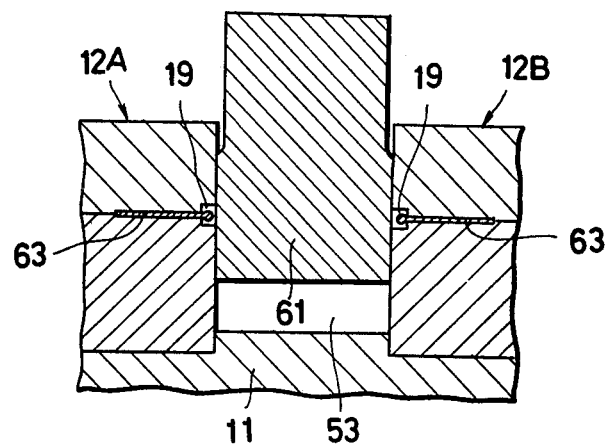
FIG. 7 is an enlarged, fragmentary cross-sectional view taken along line VII—VII of FIG. 1.

(4) Sealing the cavity mouths with the second seal means 61 at station D immediately after the cavity mouths are moved past the sprue member 15 (see FIG. 7). During the mold 12 is at this station, the molding material in the mold cavities 19 is cooled to become solid and thus is ready for ejection.

(5) Opening the mold 12 at station E, this permitting the molded articles (here fastener coupling elements 62) to be ejected. The resulting fastener stringer 65 is withdrawn by a pair of withdrawal rollers 69,69.

Specifically, at the station B, the support 32 (FIG. 3) is actuated by the pump 34 to move toward the rotatable support member 11 to connect the passage-way 26 to the fluid conduit 30. Pressure fluid is thus conducted through the passage-way 27 into the pressure chamber at one of the opposite sides of the piston 23, causing the latter to move in the direction of closing the mold 12. At the station E, the passage-way 27, when the support 32 is actuated by the pump 34, is connected to the fluid conduit 31. Pressure fluid is now conducted through the passage-way 27 into the pressure chamber at the other side of the piston 23, causing the latter to move in the direction of opening the mold 12. In either one of these opening and closing operations, there exist literally no increased amount of load acting on the shaft 16, and therefore, the driving of the shaft 16 for intermittent rotation is easy to perform accurately with a minimum amount of driving force.

Although various minor modifications may be suggested by those versed in the art, it should be understood that I wish to embody within the scope of the patent warranted hereon, all such embodiments as reasonably and properly come within the scope of my contribution to the art.

What I claim is:

1. An injection molding machine, comprising:
   (a) a base;
   (b) a rotatable support member supported on said base;
   (c) a plurality of molds supported on said support member and arranged along its periphery, said molds extending circumferentially of said support member so as to fit next to each other to provide an endless mold assembly, each of said molds including a pair of first and second mold members jointly providing a mold cavity therebetween, said first mold member being fixed to said support member, and said second mold member being pivotally mounted on said first mold member;
   (d) a plurality of power actuators carried on said support member and each operable on said second mold member of one of said molds for opening and closing said one of said molds and for maintaining the same in its open and closed positions; each of said power actuators comprising a fluid-pressurizable cylinder fixed to said support and a piston in a bore of said cylinder and having a piston rod extending from said cylinder, and a plurality of toggle joints respectively connecting said piston rod of each of said power actuators to said second mold member of the last-named one of said molds;
   (e) an injection unit having a discharge nozzle from which molding material is to be discharged, said discharge nozzle being movable with respect to the path of travel of said molds; and
   (f) a sprue member disposed between said discharge nozzle of said injection unit and said mold assembly for conducting the molding material from said discharge nozzle into said molds one after another.

2. An injection molding machine according to claim 1, each of said molds coextending with one of equally divided circumferential parts of said support member.

3. An injection molding machine according to claim 1, in which each of said molds is arcuate, providing said mold assembly in the form of a circular loop.

4. An injection molding machine according to claim 1, in which said cylinder has a pair of passage-ways each extending through one of ends of said bore of said cylinder for conducting pressurized fluid into and out of the pressure chamber at one of opposite sides of said piston.

5. An injection molding machine, comprising:
   (a) a base;
   (b) a rotatably support member supported on said base;
   (c) a plurality of molds supported on said support member and arranged along its periphery, said molds extending circumferentially of said support member so as to fit next to each other to provide an endless mold assembly, each of said molds including a pair of first and second mold members jointly providing a mold cavity therebetween, said first mold member being fixed to said support member, and said second mold member being pivotally mounted on said first mold member;
   (d) a plurality of power actuators carried on said support member and each operable on said second mold member of one of said molds for opening and closing said one of said molds and for maintaining the same in its open and closed positions;
   (e) an injection unit having a discharge nozzle from which molding material is to be discharged, said discharge nozzle being movable with respect to the path of travel of said molds; and
   (f) a sprue member disposed between said discharge nozzle of said injection unit and said mold assembly for conducting the molding material from said discharge nozzle into said molds one after another; said sprue member having a sprue communicating at one end with an orifice of said discharge nozzle, and a first seal means for temporarily sealing a mouth of the mold cavity of one of said molds immediately after the last-named mold cavity is filled with the molding material, said sprue member being movable between a first position where said sprue is communicatable at the other end with the last-named mold cavity and a second position where the mouth of the last-named mold cavity can be covered with said first seal means.

6. An injection molding machine according to claim 5, said first seal means including an exterior surface portion of said sprue member adjacent said other end of said sprue.

7. An injection molding machine according to claim 5, in which said discharge nozzle of said injection unit and said sprue member are movable as a unit.

8. An injection molding machine according to claim 5, including a second seal means extending alongside of said mold assembly for sealing the mouth of the last-named mold cavity immediately after the latter are moved past said sprue member.

9. An injection molding machine according to claim 8, in which said second seal means is in the form of an arcuate block.

10. An injection molding machine according to claim 8, in which one end of said second seal means is disposed adjacent to said sprue member.

* * * * *